United States Patent
Takahashi et al.

(10) Patent No.: US 10,525,598 B2
(45) Date of Patent: Jan. 7, 2020

(54) POSITIONING SYSTEM USING ROBOT

(71) Applicant: FANUC CORPORATION, Yamanashi (JP)

(72) Inventors: Yuutarou Takahashi, Yamanashi (JP); Shouta Takizawa, Yamanashi (JP); Fumikazu Warashina, Yamanashi (JP)

(73) Assignee: FANUC CORPORATION, Yamanshi (JP)

( * ) Notice: Subject to any disclaimer, the term of this patent is extended or adjusted under 35 U.S.C. 154(b) by 244 days.

(21) Appl. No.: 15/467,434

(22) Filed: Mar. 23, 2017

(65) Prior Publication Data
US 2017/0274534 A1    Sep. 28, 2017

(30) Foreign Application Priority Data
Mar. 25, 2016    (JP) ................. 2016-062884

(51) Int. Cl.
*B25J 9/16*    (2006.01)
*B25J 19/02*    (2006.01)

(52) U.S. Cl.
CPC ........... *B25J 9/1697* (2013.01); *B25J 9/1641* (2013.01); *B25J 9/1692* (2013.01); *B25J 19/023* (2013.01); *G05B 2219/39008* (2013.01); *G05B 2219/39024* (2013.01); *G05B 2219/39039* (2013.01); *G05B 2219/39045* (2013.01); *G05B 2219/39192* (2013.01)

(58) Field of Classification Search
CPC ...... B25J 9/1697; B25J 9/1692; B25J 9/1641; B25J 19/023; G05B 2219/39192; G05B 2219/39024; G05B 2219/39008; G05B 2219/39039; G05B 2219/39042; G05B 2219/39045; G05B 2219/39046; G05B 2219/39047; G05B 2219/40003
See application file for complete search history.

(56) References Cited

U.S. PATENT DOCUMENTS

| | | |
|---|---|---|
| 4,753,569 A | 6/1988 | Pryor |
| 5,572,102 A | 11/1996 | Goodfellow et al. |
| (Continued) | | |

FOREIGN PATENT DOCUMENTS

| | | |
|---|---|---|
| CN | 1667362 A | 9/2005 |
| CN | 102773524 A | 11/2012 |
| (Continued) | | |

OTHER PUBLICATIONS

Roger Y. Tsai, "An Efficient and Accurate Camera Calibration Technique for 3d Machine Vision", Proc. Computer Vision and Pattern Recognition '86, pp. 364-374, 1986.

*Primary Examiner* — Spencer D Patton
(74) *Attorney, Agent, or Firm* — RatnerPrestia

(57) ABSTRACT

A positioning system using a robot, capable of eliminating an error factor of the robot such as thermal expansion or backlash can be eliminated, and carrying out positioning of the robot with accuracy higher than inherent positioning accuracy of the robot. The positioning system has a robot with a movable arm, visual feature portions provided to a robot hand, and vision sensors positioned at a fixed position outside the robot and configured to capture the feature portions. The hand is configured to grip an object on which the feature portions are formed, and the vision sensors are positioned and configured to capture the respective feature portions.

5 Claims, 5 Drawing Sheets

(56) References Cited

U.S. PATENT DOCUMENTS

| | | |
|---|---|---|
| 6,414,711 B2 | 7/2002 | Arimatsu et al. |
| 6,681,151 B1 * | 1/2004 | Weinzimmer ......... B25J 9/1697 |
| | | 219/121.85 |
| 7,818,091 B2 | 10/2010 | Kazi et al. |
| 2001/0010539 A1 | 8/2001 | Arimatsu et al. |
| 2004/0254681 A1 | 12/2004 | Fisher et al. |
| 2005/0195409 A1 | 9/2005 | Watanabe et al. |
| 2006/0137164 A1 | 6/2006 | Kraus |
| 2009/0099690 A1 | 4/2009 | Verl |
| 2012/0059391 A1 * | 3/2012 | Diolaiti .................. B25J 9/1689 |
| | | 606/130 |
| 2013/0345876 A1 * | 12/2013 | Rudakevych .......... B25J 9/1697 |
| | | 700/259 |

FOREIGN PATENT DOCUMENTS

| | | |
|---|---|---|
| DE | 10345743 A1 | 5/2005 |
| DE | 102004024378 B4 | 5/2009 |
| DE | 102008019435 A1 | 10/2009 |
| EP | 0963816 B1 | 3/2006 |
| JP | 51121722 A | 10/1976 |
| JP | 62012483 A | 1/1987 |
| JP | 63020505 A | 1/1988 |
| JP | 02085709 A | 3/1990 |
| JP | 05100725 A | 4/1993 |
| JP | 05233065 A | 9/1993 |
| JP | 0970780 A | 3/1997 |
| JP | 02110489 U | 9/1999 |
| JP | 2000052178 A | 2/2000 |
| JP | 2001175313 A | 6/2001 |
| JP | 3702257 B | 10/2005 |
| JP | 2006514588 A | 5/2006 |
| JP | 2015030086 A | 2/2015 |
| JP | 2015-150636 | 8/2015 |

* cited by examiner

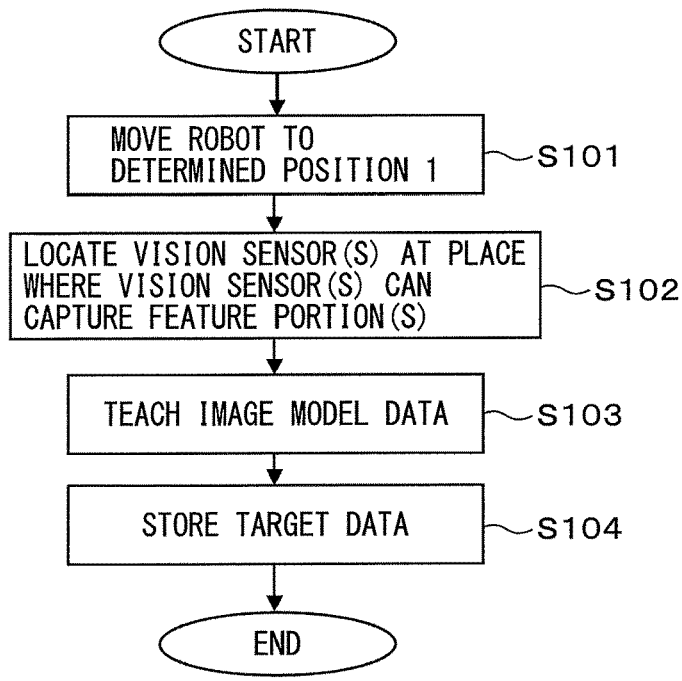
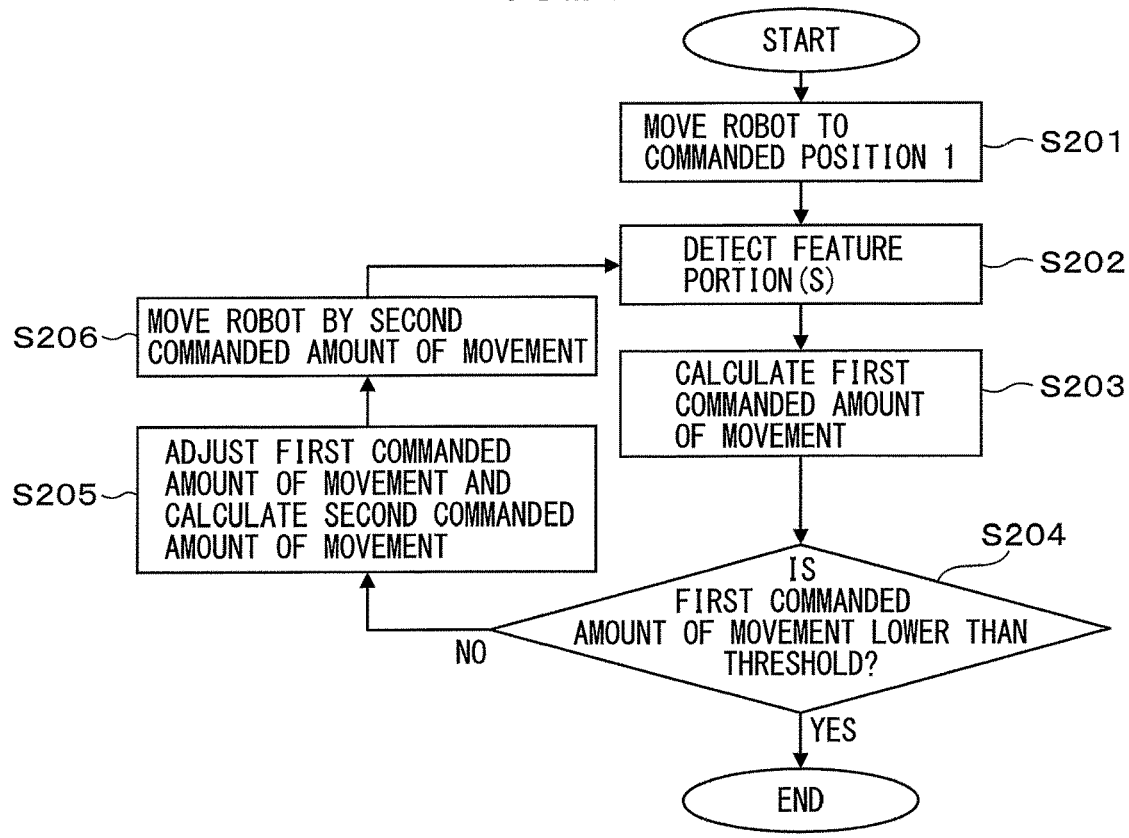

POSITIONING SYSTEM USING ROBOT

BACKGROUND OF THE INVENTION

1. Field of the Invention

The present invention relates to a positioning system using a robot, in particular, relates to a technique for using a robot as a highly accurate positioning device, by utilizing visual feedback using a vision sensor.

2. Description of the Related Art

A conventional industrial robot may be controlled by a teaching playback method, whereby the robot can precisely repeat a taught motion. Therefore, when such a robot is used to grip an object and convey it to a predetermined place, the robot can be considered as a positioning device.

As a relevant prior art document, JP 3702257 B discloses a robot handling device using a robot as a positioning device, wherein, even when a position of an object gripped by a robot hand is misaligned, the object can be precisely positioned by measuring and correcting the misalignment by using a vision sensor.

Further, JP 2015-150636 A discloses a robot system including: a robot controlled by a program for carrying out predetermined operation with respect to an object located at a first object position on a plane; a first robot position storing part for storing a position of a front end of an arm having a predetermined positional relationship relative to the first object position; a target state data storing part for storing an amount of feature of the object on an image of a camera; a robot movement calculating part for calculating an amount of movement of the robot from an arbitrary initial position so that an amount of feature of the object located at a second object position coincides with the amount of feature of the target state data; and a correction data calculating part for calculating correction data of the program based on a difference between the first robot position and a second robot position when the front end of the arm is moved based on the amount of movement.

Generally, a robot is a structure constituted from metal, etc., and thus an arm and/or a speed reducer thereof is thermally expanded or contracted due to a change in an ambient temperature, whereby the dimension thereof is varied. Since the speed reducer has backlash, a stop position of the robot may have an error depending on a movement path toward a target position. Further, the amount of backlash is not constant due to a temporal change such as abrasion. In addition, when the robot carries out the positioning an elastic member while deforming the elastic body, the position of the object or the elastic body may be deviated from an intended position, due to external force from the elastic body.

In many conventional positioning devices or methods, the error due to the thermal deformation, the backlash, the temporal change or the external force as described above, is not considered. On the other hand, it is difficult to manufacture a robot having no such errors, and it is difficult to completely correct such errors by analyzing the errors.

For example, in JP 3702257 B, discloses a robot handling device using a robot as a positioning device, wherein, even when a position of an object gripped by a robot hand is misaligned, the object can be precisely positioned by measuring and correcting the misalignment by using a vision sensor.

Further, in JP 2015-150636 A, although the robot is used as a positioning jig, it is not intended to eliminate an error factor such as thermal expansion and to carry out precise positioning. On the other hand, in JP 2015-150636 A, it is intended to easily execute an operation along a complicated movement path by using visual feedback without that the operator consider or recognize a robot coordinate system, whereas the robot is not used as the positioning device.

SUMMARY OF THE INVENTION

An object of the present invention is to provide a positioning system using a robot, capable of eliminating an error factor of the robot such as thermal expansion or backlash can be eliminated, and carrying out positioning of the robot with accuracy higher than an inherent positioning accuracy of the robot.

One aspect of the present invention provides a positioning system comprising: a robot having a movable arm; a visual feature portion provided to one of a front end of the arm or a fixed position outside the robot; a plurality of vision sensors provided to the other of the front end of the arm or the fixed position outside the robot, and configured to capture the visual feature portion; a feature amount detecting part configured to detect an amount of feature including at least one of a position, a posture and a size of the visual feature portion, on an image captured by the plurality of vision sensors; a target data storing part configured to store the amount of feature detected by the feature amount detecting part, as a first amount of feature, while the front end of the arm is positioned at a predetermined commanded position; a robot movement amount calculating part configure to: capture the feature portion by using the vision sensors, at a time point different from when the first amount of feature is detected, while the front end of the arm is positioned at or near the predetermined commanded position, so as to obtain a second amount of feature detected by the feature amount detecting part; and calculate a first commanded amount of movement of the robot, so that the second amount of feature coincides with the first amount of feature with respect to all of the vision sensors, based on a difference between the second amount of feature and the first amount of feature stored in the target data storing part; a commanded movement amount adjusting part configured to calculate a second commanded amount of movement, based on the first commanded amount of movement and a parameter determined from mechanical characteristics of the robot; and a movement commanding part configured to drive the front end of the arm based on the second commanded amount of movement, wherein the commanded movement amount adjusting part and the movement commanding part are configured to repeat the calculation of the second commanded amount of movement and the driving of the front end of the arm based on the second commanded amount of movement, until the first commanded amount of movement is equal to or lower than a predetermined threshold.

In a preferred embodiment, the commanded movement amount adjusting part is configured to: set the first commanded amount of movement as the second commanded amount of movement when the first commanded amount of movement is equal to or higher than the parameter determined from the mechanical characteristics of the robot; and set the second commanded amount of movement as a value obtained by multiplying the first commanded amount of movement by a coefficient lower than one when the first commanded amount of movement is lower than the parameter determined from mechanical characteristics of the robot.

In another preferred embodiment, the commanded movement amount adjusting part is configured to: calculate an amount of motion of each movable part of the robot generated by the movement of the robot based on the first commanded amount of movement; and calculate the second commanded amount of movement based on the amount of motion of each movable part.

In another preferred embodiment, the commanded movement amount adjusting part is configured to: estimate performance deterioration of the robot due to a temporal change from a working situation of the robot; adjust the parameter determined from the mechanical characteristics of the robot based on the estimation; and calculate the second commanded amount of movement based on the first commanded amount of movement and the adjusted parameter.

In the positioning system, the plurality of vision sensors may capture one feature portion. Otherwise, in the positioning system, the plurality of vision sensors may capture a plurality of feature portions, respectively.

BRIEF DESCRIPTION OF THE DRAWINGS

The above and other objects, features and advantages of the present invention will be made more apparent by the following description of the preferred embodiments thereof with reference to the accompanying drawings wherein:

FIG. 4 is a flowchart showing an example of a procedure when the positioning system of FIG. 1 is started up;

FIG. 5 is a flowchart showing an example of a procedure when the positioning system of FIG. 1 is operated;

DETAILED DESCRIPTION

Figure 1:
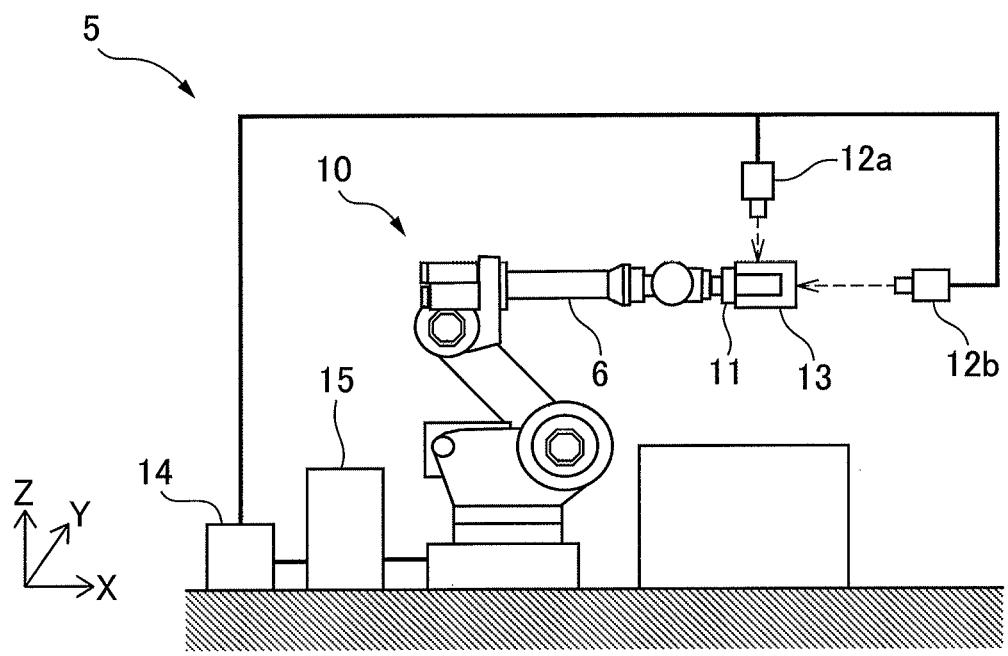
FIG. 1 is a view showing a schematic configuration of a positioning system according to a first embodiment of the present invention.

FIG. 1 shows a schematic configuration of a positioning system (or a robot system) 5 according to a first embodiment of the present invention. Positioning system 5 includes a robot 10 having a movable arm 6; a visual feature portion arranged on a front end (in the illustrated embodiment, a hand 11) of arm 6; and a plurality of (in the illustrated embodiment, two) vision sensors 12a and 12b arranged on a fixed place outside robot 10, and configured to capture the feature portion. For example, robot 10 is a multi-joint robot having six axes, and robot 10 may be a conventional robot.

Figure 2:
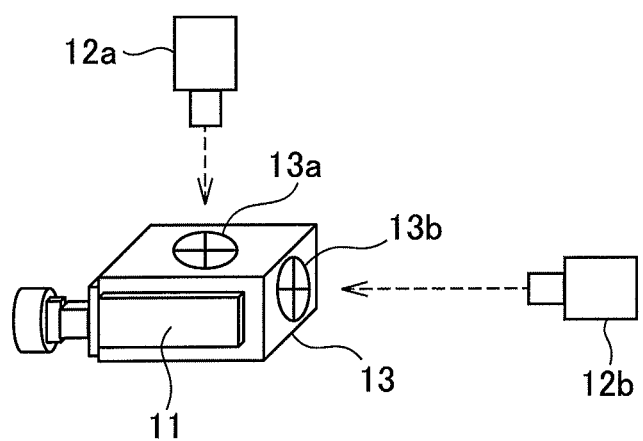
FIG. 2 is a view exemplifying a hand of a robot included in the positioning system of FIG. 1, and an object gripped by the hand.

As shown in FIG. 2, hand 11 of robot 10 is configured to grip an object 13 on which feature portions 13a and 13b are formed. In this non-limited example, first vision sensor 12a is positioned and configured to capture first feature portion 13a, and second vision sensor 12b is positioned and configured to capture second feature portion 13b. Otherwise, feature portions 13a and 13b may be directly formed on hand 11. The shape of the feature portion may be any shape as long as an image obtained by capturing the feature portion is adapted to be processed. Preferably, the feature portion is a circle including a cross-line therein, etc., so that the position, the posture (or the rotation angle) and the size (inversely proportional to the distance between the vision sensor and the feature portion) of the feature portion can be detected by the image processing.

Robot 10 is connected to a robot controller 15 configured to control robot 10, and is numerically controlled so as to move to an arbitrary position designated by robot controller 15. Each of vision sensors 12a and 12b may be a light-receiving device having a function to capture an image (of the above feature portion), and images captured by vision sensors 12a and 12b may be transmitted to an image processor 14 connected to vision sensors 12a and 12b.

Figure 3:
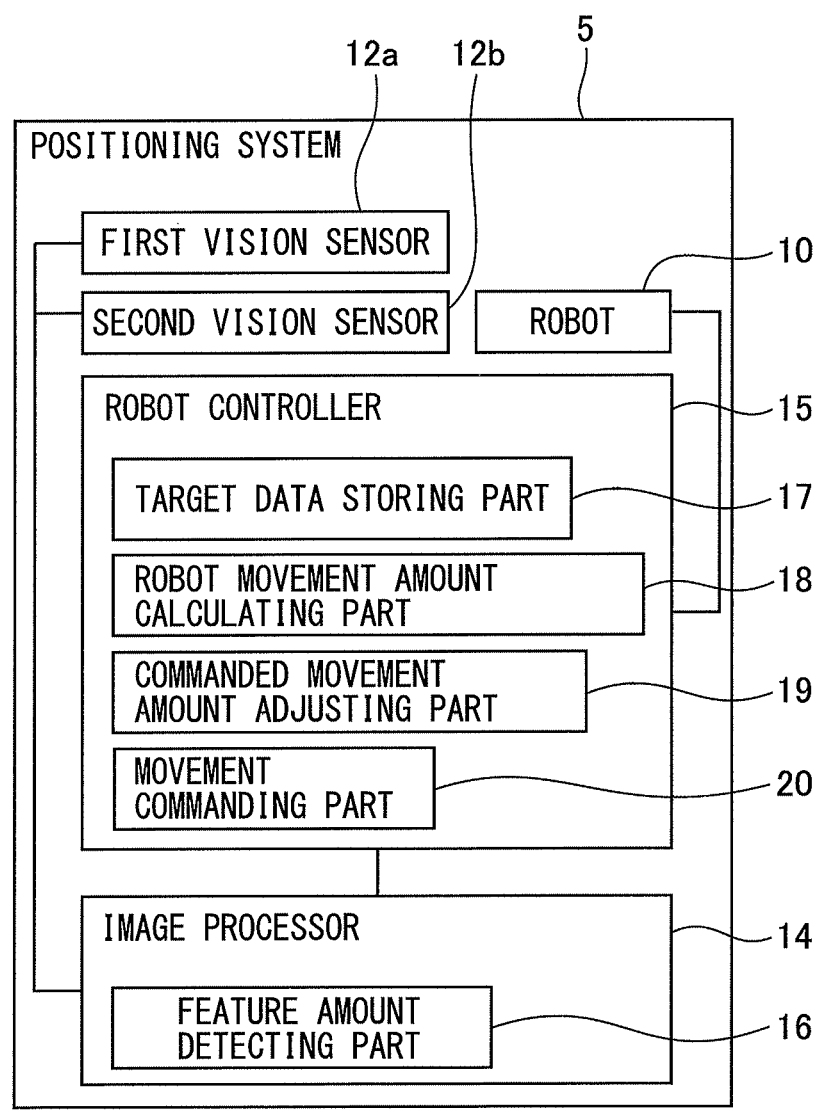
FIG. 3 is a functional block diagram of the positioning system of FIG. 1.

FIG. 3 is a functional block diagram of positioning system 5. Image processor 14 has a feature amount detecting part 16 configured to detect feature portions 13a and 13b from the respective images captured by vision sensors 12a and 12b, and detect an amount of feature (or a feature parameter) including at least one of a position, a posture and a size of each of visual feature portions 13a and 13b, on the respective captured images. Further, image processor 14 may be connected to robot controller 15 via a communication cable or by radio, so as to receive a command from robot controller 15 and/or transmit a result of the image processing. Although image processor 14 is described as a device (e.g., a personal computer) separated from robot controller 15 in FIGS. 1 and 3, image processor 14 may be incorporated in robot controller 15 as a processor, etc.

In this embodiment, before a procedure as explained below is carried out, it is not necessary to calibrate vision sensors 12a and 12b. In other words, it is not necessary to previously carry out positional alignment between a sensor coordinate system of the vision sensors and a robot coordinate system of robot 10. Of course, the calibration may be previously carried out, but even in this case, it is sufficient that only a direction and a scale of the robot coordinate system relative to the sensor coordinate system are clarified in the calibration.

As shown in FIG. 3, robot controller 15 has: a target data storing part 17 configured to store the amount of feature detected by feature amount detecting part 16, as a first amount of feature (or target data), while hand 11 is positioned at a predetermined commanded position; a robot movement amount calculating part 18 configure to: capture feature portions 13a and 13b by using vision sensors 12a and 12b, respectively, at a time point different from when the first amount of feature is detected, while hand 11 is positioned at or near the predetermined commanded position, so as to obtain a second amount of feature detected by feature amount detecting part 16; and calculate a first commanded amount of movement of robot 10, so that the second amount of feature coincides with the first amount of feature with respect to all of the vision sensors, based on a difference between the second amount of feature and the first amount of feature stored in target data storing part 17; a commanded movement amount adjusting part 19 configured to calculate a second commanded amount of movement, based on the first commanded amount of movement and a parameter (as explained below) determined from mechanical characteristics of robot 10; and a movement commanding part 20 configured to drive hand 11 (or robot 10) based on the second commanded amount of movement. In addition, commanded movement amount adjusting part 19 and movement commanding part 20 are configured to repeat the calculation of the second commanded amount of movement and the driving of hand 11 based on the second commanded amount of movement, until the first commanded amount of movement is equal to or lower than a predetermined threshold.

Hereinafter, a procedure in positioning system 5 will be explained, with reference to flowcharts of FIGS. 4 and 5.

FIG. 4 is a flowchart showing the procedure when the robot system including positioning system 5 is started up. First, robot 10 is moved to a predetermined commanded position (or determined position 1) (step S101). Then, vision sensors 12a and 12b are positioned so that feature portions 13a and 13b arranged on hand 11 or object 13 gripped by hand 11 are positioned within fields, of view of vision sensors 12a and 12b, respectively (step S102). In this regard, it is preferable that each vision sensor be positioned and oriented so that an optical axis of each vision sensor is generally perpendicular to the surface of feature portion to be captured, but the present invention is not limited as such. Further, it is preferable that feature portions 13a and 13b be positioned at the generally center of the fields of view of vision sensors 12a and 12b, respectively, but the present invention is not limited as such.

Next, feature portions 13a and 13b are respectively captured by vision sensors 12a and 12b so as to obtain images of the feature portions, and the images of feature portions 13a and 13b are taught as model data (step S103). In this regard, a type of information to be stored as the model data depends on an algorithm of the image processing for detecting feature portions 13a and 13b from the images. In this embodiment, any algorithm of the image processing can be used, for example, conventional method, such as template matching using normalized correlation or generalized Hough transform using edge information, can be used. When the template matching by normalized correlation is used, the template corresponds to the model data.

Finally, by using the taught model data, feature portions 13a and 13b are detected from the images, and a first amount of feature, including at least one of the position, the posture and the size of the detected respective feature portions on the images, is stored as target data in target data storing part 17 (step S104). For example, when the template matching is used as the algorithm of the image processing, the center position, the rotation angle and the enlargement/reduction ratio of a template having the highest degree of coincidence are stored as the target data. As such, target storing part 17 stores the first amount of feature with respect to both feature portions 13a and 13b. In addition, robot controller 15 stores the position of robot 10 in the control when storing the target data is stored as commanded position 1 in a proper memory.

Next, FIG. 5 is a flowchart showing the procedure when the robot system including positioning system 5 is operated. First, in step S201, robot 10 is moved to a position which is the same as or near commanded position 1 as described above, at a time point different from when the target data is stored (i.e., when the first amount of feature is detected) in step S104 of FIG. 4. In this regard, the expression "(the position) near commanded position 1" means a position which does not precisely coincide with commanded position 1, but at the position, feature portions 13a and 13b are positioned in the respective fields of view of vision sensors 12a and 12b, and the posture of robot 10 is the same as the posture of robot 10 when storing the target data.

Even when robot 10 is precisely moved to or near commanded position 1 in the control, robot 10 may not be precisely moved to the position (determined position 1) corresponding to commanded position 1 in fact, due to an error factor with respect to each portion of robot 10, such as thermal deformation due to a change in temperature, an effect of backlash, a temporal change due to abrasion, and an effect of external force (when an elastic object is positioned while deforming the object, the robot is subject to the external force), etc.

Next, feature portions 13a and 13b are respectively captured by vision sensors 12a and 12b so as to obtain images of the feature portions, and feature portions 13a and 13b are detected from the images (step S202). The same means or method as in step S104 may be used as the algorithm of the image processing, so as to calculate a second amount of feature (or the current amount of feature) including at least one of the position, the posture and the size of each feature portion on the image.

Next, in step S203, a first commanded amount of movement for the robot is calculated, based on which robot 10 is moved to a position where the second (current) amount of feature coincides with the first amount of feature stored as the target data. A concrete example of the procedure in step S203 will be explained below.

Next, it is judged as to whether or not the current robot position reaches determined position 1 (step S204).

Concretely, the first commanded amount of movement calculated in step S203 is compared to a predetermined threshold, and then, when the first commanded amount of movement is equal to or lower than the threshold, it can be judged that robot 10 has reached determined position 1. For example, if the threshold is set to 0.5 mm, it can be judged that robot 10 has reached determined position 1 when the first commanded amount of movement is lower than 0.5 mm. In this regard, it is preferable that the threshold be determined so that the robot can be positioned at the target position with accuracy higher than positioning accuracy inherently provided to the robot.

In step S205, when robot 10 does not reach determined position 1, a second commanded amount of movement is calculated by adjusting the first commanded amount of movement calculated in step S203, and then robot 10 is moved based on the second commanded amount of movement (step S206). After that, the procedure is returned to step S202, and the same procedure is repeated. A concrete example of the procedure in step S206 will be explained below.

On the other hand, when it is judged that robot 10 has reached determined position 1 in step S204, it can be considered that robot 10 is precisely positioned, and thus the series of procedure and motion is terminated.

Hereinafter, two concrete examples of calculation methods in step S203 will be explained, in which the first commanded amount of movement is calculated based on the current (second) amount of feature obtained by the image and the first amount of feature stored as the target data in target data storing part 17, in order that the position of robot 10 coincides with determined position 1. Although these methods relate to vision sensor 12a, the same is also applicable to vision sensor 12b, and thus an explanation of vision sensor 12b will be omitted.

The first example is a method for aligning the sensor coordinate system with the robot coordinate system (i.e., calibration). As an example of a document which describes a detail of the calibration of the vision sensor, "Roger Y. Tsai, "An efficient and accurate camera calibration technique for 3D machine vision", Proc. Computer Vision and Pattern Recognition '86, pp. 368-374, 1986" may be used.

Figure 6:
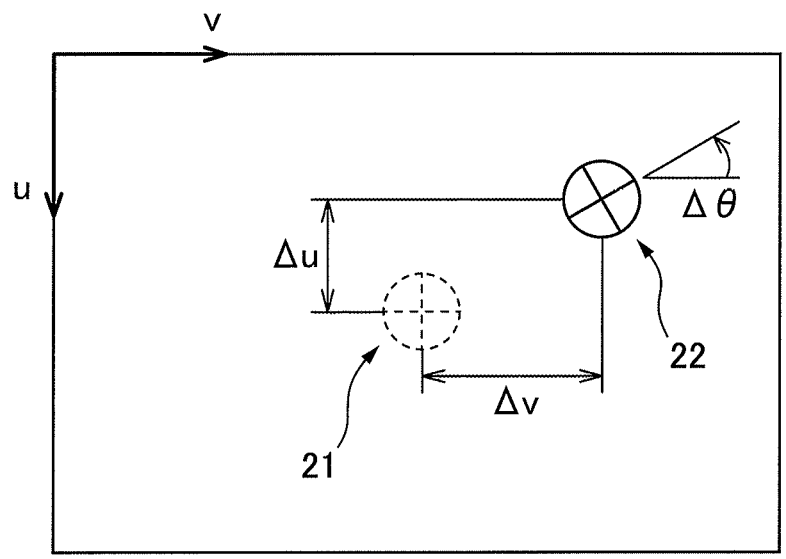
FIG. 6 is a view exemplifying an image of a feature portion, in which the feature portion when storing target data is indicated by a dashed-line and the same feature portion at the present time is indicated by a solid-line.

FIG. 6 exemplifies that, in step S203, the image of feature portion 13a when storing the target data (step S104) is indicated by a dashed line 21, and the image of feature portion 13a at the current time (step S202) is indicated by a solid line 22. In this regard, when the position of the feature portion on the vision sensor coordinate system is represented as (u, v), a value Δu corresponds to a positional difference of the image in the longitudinal direction, and a value Δv corresponds to a positional difference of the image in the transverse direction. By calibrating vision sensor 12a by using the method as described in the above document, the position (u, v) on the sensor coordinate system of vision sensor 12a can be converted to the position (x, y, z) on the robot coordinate system of robot 10.

In detail, the current position (u, v) of feature portion 13a on the image and the position $(u_0, v_0)$ of feature portion 13a on the image stored as the target data are converted to the position (x, y, z) and the position $(x_0, y_0, z_0)$ on the coordinate system of robot 10, respectively. In this case, when a commanded amount of movement of the robot to be calculated is represented as (Δx, Δy, Δz), Δx, Δy and Δz can be defined by following equations (1), (2) and (3), respectively.

$$\Delta x = x_0 - x \quad (1)$$

$$\Delta y = y_0 - y \quad (2)$$

$$\Delta z = z_0 - z \quad (3)$$

By virtue of equations (1) to (3), the commanded amount of movement (Δx, Δy, Δz) of the robot can be calculated, by which the position of robot 10 coincides with determined position 1.

The second example is a method using a Jacobian matrix. In this method, the commanded amount movement of the robot for matching the robot position with determined position 1 is calculated based on a difference between the second amount of feature of detected feature portion 13a and the first amount of feature stored as the target data. As exemplified in FIG. 6, when the position of the feature portion on the vision sensor coordinate system is represented as (u, v), value Δu corresponds to the positional difference of the image in the longitudinal direction, and value Δv corresponds to a positional difference of the image in the transverse direction, as described above.

In the second example, an amount of feature of a visual size on the image is represented as "s." For example, in the template matching, the size of the template may be determined as 100% (=1.0). In this case, when the visual size of the object is larger than the template, "s" is higher than 1.0, on the other hand, when the visual size of the object is smaller than the template, "s" is smaller than 1.

Next, when the first amount of feature stored as the target data is represented as $(u_0, v_0, s_0)$, and the second amount of feature obtained in step S202 is represented as $(u_1, v_1, s_1)$, a difference between the amounts of feature can be defined by following equations (4) to (6). In this regard, since amount of feature "s" of the visual size on the image is inversely proportional to the distance between vision sensor 12a and the top surface of object 13 having feature portion 13a thereon, a reciprocal of "s" is used so as to obtain a value proportional to the distance.

$$\Delta u = u_1 - u_0 \quad (4)$$

$$\Delta v = v_1 - v_0 \quad (5)$$

$$\Delta s = \frac{1}{s_1} - \frac{1}{s_0} \quad (6)$$

Then, when the commanded amount of movement of the robot to be calculated is represented as (Δx, Δy, Δz), Jacobian matrix J is defined by following equation (7).

$$\begin{bmatrix} \Delta x \\ \Delta y \\ \Delta z \end{bmatrix} = J \begin{bmatrix} \Delta u \\ \Delta v \\ \Delta s \end{bmatrix} \quad (7)$$

Next, a method for calculating Jacobian matrix J will be explained. First, when feature portion 13a is positioned at or near the center of the image, the position of the robot at that point is determined as an original position. Then, feature portion 13a is detected from the image obtained by vision sensor 12a while robot 10 is positioned at the original position, and the obtained amount of feature is represented as $(u_0, v_0, s_0)$. Next, robot 10 is moved from the original position by a distance "m" in the X-direction of the orthogonal coordinate system as exemplified in FIG. 1, feature portion 13a is detected from the image obtained by vision sensor 12a after the movement, and the obtained amount of feature is represented as $(u_x, v_x, s_x)$. Similarly, robot 10 is moved from the original position by distance "m" in the Y-direction of the orthogonal coordinate system, feature portion 13a is detected from the image obtained by vision sensor 12a after the movement, and the obtained amount of feature is represented as $(u_y, v_y, s_y)$. Further, robot 10 is moved from the original position by distance "m" in the Z-direction of the orthogonal coordinate system, feature portion 13a is detected from the image obtained by vision sensor 12a after the movement, and the obtained amount of feature is represented as $(u_z, v_z, s_z)$. In addition, the coordinate system for representing the commanded amount of movement is not limited to the orthogonal coordinate system as shown in FIG. 1, and another coordinate system may be used instead.

Based on the above detection result of feature portion 13a after moving the robot in the X-, Y- and Z-directions and the detection result of feature portion 13a at the original position, Δu, Δv and Δs can be defined by following equations (8) to (16).

$$\Delta u_x = u_x - u_0 \quad (8)$$

$$\Delta v_x = v_x - v_0 \quad (9)$$

$$\Delta s_x = \frac{1}{s_x} - \frac{1}{s_0} \quad (10)$$

$$\Delta u_y = u_y - u_0 \quad (11)$$

$$\Delta v_y = v_y - v_0 \quad (12)$$

$$\Delta s_y = \frac{1}{s_y} - \frac{1}{s_0} \quad (13)$$

$$\Delta u_z = u_z - u_0 \quad (14)$$

-continued $$\Delta v_z = v_z - v_0 \quad (15)$$

$$\Delta s_z = \frac{1}{s_z} - \frac{1}{s_0} \quad (16)$$

By substituting equations (8) to (16) equation (7), following equations (17) and (18) for calculating Jacobian matrix J are obtained.

$$\begin{bmatrix} m & 0 & 0 \\ 0 & m & 0 \\ 0 & 0 & m \end{bmatrix} = J \begin{bmatrix} \Delta u_x & \Delta u_y & \Delta u_z \\ \Delta v_x & \Delta v_y & \Delta v_z \\ \Delta s_x & \Delta s_y & \Delta s_z \end{bmatrix} \quad (17)$$

$$J = \begin{bmatrix} m & 0 & 0 \\ 0 & m & 0 \\ 0 & 0 & m \end{bmatrix} \begin{bmatrix} \Delta u_x & \Delta u_y & \Delta u_z \\ \Delta v_x & \Delta v_y & \Delta v_z \\ \Delta s_x & \Delta s_y & \Delta s_z \end{bmatrix} \quad (18)$$

After Jacobian matrix J is calculated, by substituting arbitrary amount of feature (u, v, s) of feature portion 13a into equation (7), the commanded amount of movement (Δx, Δy, Δz) of the robot, by which the position of robot 10 coincides with determined position 1, can be calculated.

Since robot 10 gradually approach determined position 1, it is not necessary to precisely calculate the commanded amount of movement. Therefore, it is advantageous to apply the method using the Jacobian matrix to this embodiment.

Hereinafter, an example of a calculation method in step S205 of FIG. 5 will be explained, in which the second commanded amount of movement is calculated by adjusting the first commanded amount of movement obtained in step S203 based on a parameter determined from mechanical characteristics of robot 10. In this example, a backlash is considered as the mechanical characteristics of robot 10.

Generally, the backlash exists in each movable part of robot 10, and may vary depending on the gravity force applied to robot. Therefore, it is difficult to geometrically calculate an error occurred in the front end (hand 11) of robot 10 due to the backlash. In view of the above, first, by considering the state of each movable part of robot 10 and the posture of robot 10, an error range of the position of the front end of the arm of robot 10 due to the backlash is compositely calculated. The calculated error range corresponds to the parameter determined by the mechanical characteristics of the robot. In this example, the parameter is referred to as a first parameter.

Next, based on the above first parameter and the first commanded amount of movement calculated in step S203, commanded movement amount adjusting part 19 calculates the second commanded amount of movement (step S205). Concretely, when the first commanded amount of movement is within the error range of the front end of the arm, the first commanded amount of movement is determined as the second commanded amount of movement. On the other hand, when the first commanded amount of movement is not within the error range of the front end of the arm, a value obtained by multiplying the first commanded amount of movement by a coefficient smaller than one is determined as the second commanded amount of movement, so that the front end of the arm of robot 10 is moved while limiting the amount of movement thereof. A detail of step S205 is explained below.

Figure 7:
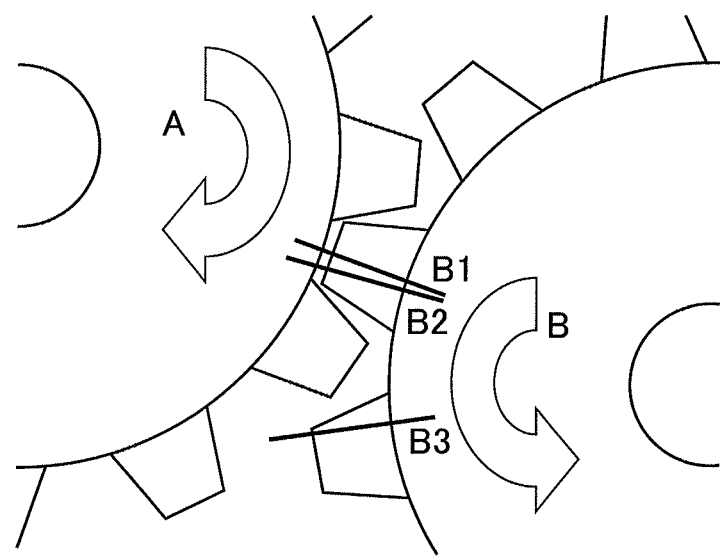
FIG. 7 is a view explaining an example for calculating a commanded amount of movement when an error range due to a backlash exists.

FIG. 7 explains an example for calculating the second commanded amount of movement when there is a certain error range due the backlash. In general, when robot 10 is moved, a plurality of gears provided to each movable part are engaged to each other and are rotated by an angle (amount) corresponding to the commanded amount of movement. In the example of FIG. 7, in one movable part of robot 10, gears A and B are engaged to each other, and gear B is rotated (or driven) in the counterclockwise direction, by rotating (or driving) in the clockwise direction.

When the first commanded amount of movement is larger than the first parameter (for example, when the first amount of movement is intended to rotate gear B from current position B1 to position B3), gear A may be rotated by the commanded amount of movement while being engaged to gear B. Therefore, the first commanded amount of movement without being changed may be determined as the second commanded amount of movement.

On the other hand, if the first commanded amount of movement is smaller than the first parameter (for example, when the first amount of movement is intended to rotate gear B from current position B1 to position B2 relatively close to position B1), gear B may overshoot position B2 when gear B is rotated by the commanded amount of movement while being fully engaged to gear A, whereby the robot cannot be precisely positioned at determined position 1. Therefore, in such a case, by setting the second commanded amount of movement to the value obtained by multiplying the first commanded amount of movement by the coefficient smaller than one, gear B can be moved by a small distance step-by-step, whereby gear B can be rotated from position B1 to B2 without overshooting B2.

By moving the front end of the arm of robot 10 by the above method, the robot position can efficiently converge to determined position 1.

Although the backlash is explained in the example of FIG. 7, the present invention is not limited as such. For example, the positioning system of the embodiment can be similarly applied to a system for correcting a mechanical play such as a lost motion of the robot.

As another procedure in step S205, commanded movement amount adjusting part 19 may calculate an amount of motion of each movable part of robot 10 generated by moving robot 10 based on the first commanded amount of movement, and then may calculate the second commanded amount of movement based on the calculated amount of motion of each movable part. Concretely, the amount of motion (rotation) of each movable part may be calculated based on the difference (or displacement) (step S202) of the front end of the arm of robot 10, and the second commanded amount of movement for the front end of the robot arm may be calculated by inversely transforming the amount of motion after multiplying the amount of motion by a necessary coefficient.

As still another procedure in step S205, commanded movement amount adjusting part 19 may: estimate performance deterioration of robot 10 due to a temporal change from a working situation of the robot; adjust the parameter determined from the mechanical characteristics of robot 10 based on the estimation; and calculate the second commanded amount of movement based on the first commanded amount of movement and the adjusted parameter. Concretely, an amount of increase in the backlash due to the temporal change may be estimated from periodically stored data, etc., the first parameter may be changed by the estimated amount of increase, and the second commanded amount of movement may be calculated based on the first commanded amount of movement and the changed first parameter.

In this embodiment, the object of the positioning is different depending on what is used as the amount of feature of feature portion 13a. For example, when the position on the image is used as the amount of feature, the position on a plane where feature portion 13a is arranged can be determined. When the posture on the image is used as the amount of feature, the rotation angle on the plane can be determined. Further, when the size on the image is used as the amount of feature, the height from the plane in a normal direction thereof can be determined.

The procedure as in steps S203 and S205 may be carried out with respect to vision sensor 12b, similarly to vision sensor 12a. Then, the two sets of (first) amounts of feature of feature portions 13a and 13b stored in target data storing part 17 are respectively compared to the two sets of current (second) amounts of feature of feature portions 13a and 13b in order to obtain differences therebetween, and the first commanded amount of movement of robot 10 is calculated based on the differences.

The first commanded amount of movement ($\Delta x$, $\Delta y$, $\Delta z$) of robot 10 is represented by following equations (19) to (21), wherein the first amount of movement calculated from the amount of feature of feature portion 13a is represented as ($\Delta x_a$, $\Delta y_a$, $\Delta z_a$), and the first amount of movement calculated from the amount of feature of feature portion 13b is represented as ($\Delta x_b$, $\Delta y_b$, $\Delta z_b$).

$$\Delta x = \Delta x_a \quad (19)$$

$$\Delta y = \Delta y_a \quad (20)$$

$$\Delta z = \Delta z_b \quad (21)$$

Equations (19) to (21) correspond to a method for calculating the first commanded amount of movement when vision sensors 12a and 12b are arranged as shown in FIG. 1. In other words, the positioning of robot 10 in the X- and Y-directions is carried out by using vision sensor 12a and feature portion 13a, and the positioning of robot 10 in the Z-direction is carried out by using vision sensor 12b and feature portion 13b.

In the example of FIG. 1, the detecting direction of vision sensor 12a is perpendicular to the X-Y plane, and thus high-sensitive measurement can be carried out in the X- and Y-directions. Further, since the detecting direction of vision sensor 12b is perpendicular to the Y-Z plane, high-sensitive measurement can be carried out in the Y- and Z-directions. As such, by using the plurality of vision sensors, high-sensitive measurement can be carried out in all of the X-, Y- and Z-directions. However, the present invention is not limited to such an example, and the sensors may be located at the other positions and/or may be orientated so as to represent the other posture, so that high-sensitive measurement can be carried out in all of the directions.

Figure 8:
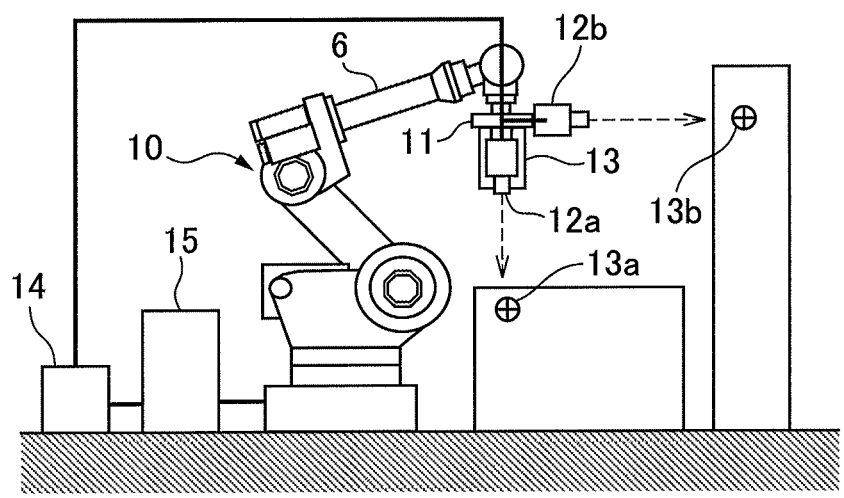
FIG. 8 is a view showing a schematic configuration of a positioning system according to a second embodiment of the present invention.

FIG. 8 shows a schematic configuration of a positioning system (or a robot system) according to a second embodiment of the present invention. Although the basic configuration of the second embodiment may be the same as the first embodiment, the second embodiment is different from the first embodiment in that vision sensors 12a and 12b are arranged on hand 11 of robot 10, and feature portions 13a and 13b are arranged on fixed positions outside robot 10.

The second embodiment is different from the first embodiment, in that, in step S102 of the procedure for starting up the robot system (FIG. 4), feature portions 13a and 13b (not vision sensors 12a and 12b) are positioned so that feature portions 13a and 13b can be captured by vision sensors 12a and 12b, respectively. Since the other procedure of the second embodiment may be the same as the first embodiment, a detailed explanation thereof is omitted.

In either of the above embodiments, the plurality of feature portions is respectively captured by the plurality of vision sensors. However, one feature portion may be captured from different positions or angles, by using the plurality of vision sensors. Concretely, two vision sensors may be used as a stereo camera, and one feature portion may be measured by the stereo camera.

In the above embodiment, the visual feature portion is arranged on the front end of the robot arm, and the feature portion is measured by the vision sensors positioned at the fixed place outside the robot. Alternatively, the vision sensors are positioned on the front end of the robot arm, and the visual feature portion arranged at the fixed place outside the robot is measured by the vision sensors. Next, while the robot is positioned at the determined position, the position of the feature portion viewed on each image of each vision sensor is stored as the target data. If the position of the feature portion viewed on the current image of the vision sensor is the same as the position stored as the target data, it can be considered that the robot is physically positioned at the determined position. Therefore, by controlling the robot so that the position of the feature portion viewed on the image of the vision sensor is the same as the position stored as the target data, the front end of the robot arm can be positioned at the determined position.

In many cases, the robot arm is driven via a speed reducer, and the speed reducer has a backlash. In this regard, even when the commanded amount of movement is precisely calculated so that the position of the feature portion viewed on the image of the vision sensor is the same as the position stored as the target data, the front end of the robot arm is not always physically moved by the commanded amount of movement. Therefore, the front end of the robot arm can be precisely positioned at the determined position, by adjusting the commanded amount of movement based on the parameter determined from the mechanical characteristic of the robot, such as the width (range) of the backlash, without moving the front end of the robot arm by the unadjusted commanded amount of movement.

Further, by repeating the above control (i.e., calculating the amount of movement of the front end of the robot arm so that the position of the feature portion viewed on the current image of the vision sensor is the same as the position stored as the target data; adjusting the calculated amount of movement by the parameter determined from the mechanical characteristic of the robot; and actually moving the robot based on the adjusted amount of movement) until the calculated commanded amount of movement becomes equal to or lower than a predetermined threshold, the front end of the robot arm can gradually approach the determined position. Since the robot can gradually approach the determined position, it is not necessary that the calculated commanded amount of movement be a precise value. This means that, even when the vision sensor is not precisely calibrated, the robot can be positioned at the determined position with the accuracy higher than the inherent positioning accuracy of the robot, and that the robot can be used as a high-accuracy positioning system without depending on various error factors of the robot.

According to the present invention, by utilizing the visual feedback and adjusting the amount of movement by the parameter determined from the mechanical characteristic of the robot, the error factors of the robot (such as thermal deformation due to a change in temperature, an effect of a backlash, positional misalignment due to an external force, and a temporal change due to abrasion) can be reduced or eliminated, without depending on whether or not the calibration is carried out, while an operator does not need to consider an amendment. Therefore, the robot can be used as a high-accuracy positioning system with the accuracy higher than the inherent positioning accuracy of the robot.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A positioning system comprising:
    a robot having a movable arm;
    a visual feature portion provided to one of a front end of the arm or a fixed position outside the robot;
    a plurality of vision sensors provided to the other of the front end of the arm or the fixed position outside the robot, and configured to capture the visual feature portion; and
    a processor configured to:
        detect a parameter of a feature including at least one of a position, a posture and a size of the visual feature portion, on an image captured by the plurality of vision sensors;
        store the parameter of the feature, as a first parameter of the feature, while the front end of the arm is positioned at a predetermined commanded position;
        capture the feature portion by using the vision sensors, at a time point different from when the first parameter of the feature is detected, while the front end of the arm is positioned at or near the predetermined commanded position, so as to obtain a second parameter of the feature;
        calculate a first commanded amount of movement of the robot, so that the second parameter of the feature coincides with the first parameter of the feature with respect to all of the vision sensors, based on a difference between the second parameter of the feature and the first parameter of the feature stored;
        calculate a second commanded amount of movement, based on the first commanded amount of movement and a mechanical parameter determined from mechanical characteristics of the robot; and
        drive the front end of the arm based on the second commanded amount of movement,
    wherein the processor is further configured to repeat the calculation of the second commanded amount of movement and the driving of the front end of the arm based on the second commanded amount of movement, until the first commanded amount of movement is equal to or lower than a predetermined threshold, so that the front end of the arm gradually approaches a determined position, and is positioned at the determined position with an accuracy higher than an inherent positioning accuracy of the robot, and
    wherein the processor is further configured to:
        set the first commanded amount of movement as the second commanded amount of movement when the first commanded amount of movement is equal to or higher than the parameter determined from the mechanical characteristics of the robot, and
        set the second commanded amount of movement as a value obtained by multiplying the first commanded amount of movement by a coefficient lower than one when the first commanded amount of movement is lower than the parameter determined from mechanical characteristics of the robot.

2. The positioning system as set forth in claim 1, wherein the processor is further configured to:
    calculate an amount of motion of each movable part of the robot generated by the movement of the robot based on the first commanded amount of movement; and
    calculate the second commanded amount of movement based on the amount of motion of each movable part.

3. The positioning system as set forth in claim 1, wherein the processor is further configured to:
    estimate performance deterioration of the robot due to a temporal change from a working situation of the robot;
    adjust the parameter determined from the mechanical characteristics of the robot based on the estimation; and
    calculate the second commanded amount of movement based on the first commanded amount of movement and the adjusted parameter.

4. The positioning system as set forth in claim 1, wherein the plurality of vision sensors capture one feature portion.

5. The positioning system as set forth in claim 1, wherein the plurality of vision sensors capture a plurality of feature portions, respectively.

* * * * *